United States Patent [19]

York

[11] 3,975,058

[45] Aug. 17, 1976

[54] PARTICULATE SOLIDS PUMP

[75] Inventor: Leonard R. York, Denver, Colo.

[73] Assignee: Lafayette Engineering & Manufacturing, Inc., Denver, Colo.

[22] Filed: May 12, 1975

[21] Appl. No.: 576,875

[52] U.S. Cl. .................................. 302/50; 277/59
[51] Int. Cl.² .................. B65G 53/48; F16J 15/54
[58] Field of Search ...................... 302/50; 308/36.1; 277/51, 59, 67, 134

[56] References Cited
UNITED STATES PATENTS

| | | | |
|---|---|---|---|
| 2,355,774 | 8/1944 | Baker | 302/50 |
| 3,602,552 | 8/1971 | Morgan | 302/50 |

Primary Examiner—Richard A. Schacher
Assistant Examiner—James L. Rowland
Attorney, Agent, or Firm—Max L. Wymore

[57] ABSTRACT

This particulate solids pump is of the screw conveyor type for transmitting particulate solids from a hopper through a barrel when the screw conveyor is rotated and in which a flowstream of gas is supplied for facilitating the movement and suspension of the particulate solids after exiting the barrel. A sealing chamber formed by termination of the screw conveyor short of the exit end of the barrel provides an accumulation of particulate solids therebetween and a spring biased flapper valve to form a blow-back pressure seal. A flapper valve at the exit end of the barrel operates to loft the particulate solids exiting from the barrel into the flowstream of gas. A sealing apparatus provides lateral and axial sealing of the rotating shaft of the screw conveyor.

23 Claims, 10 Drawing Figures

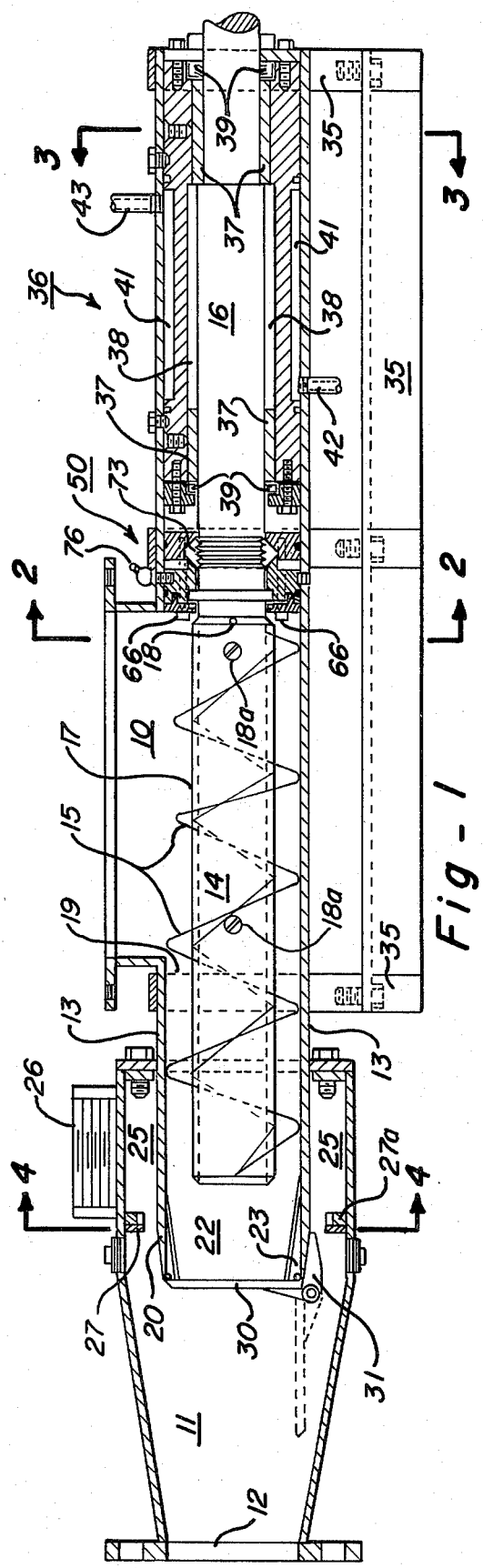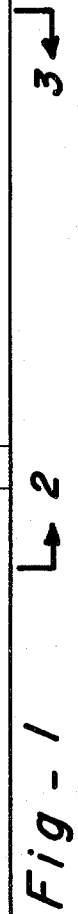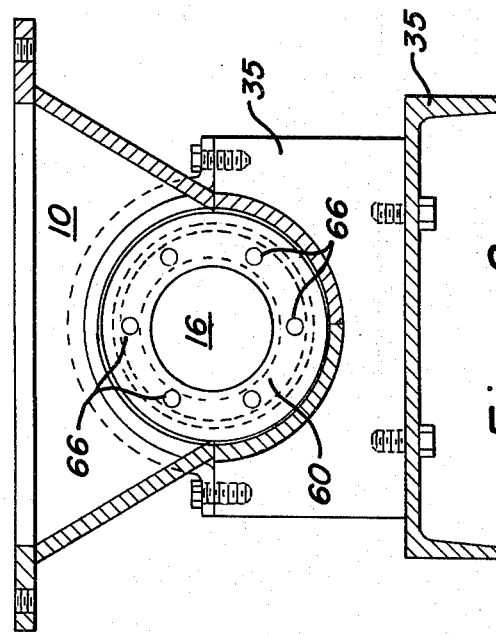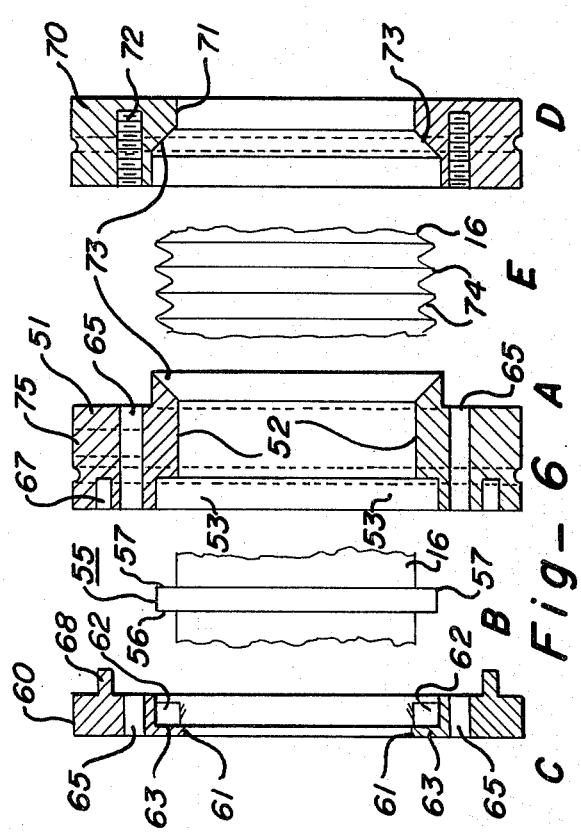

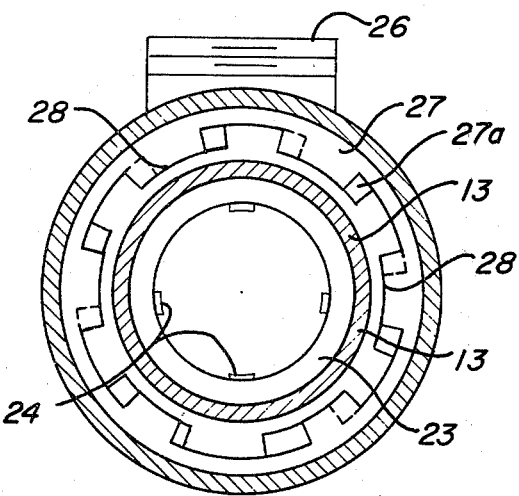
Fig_4
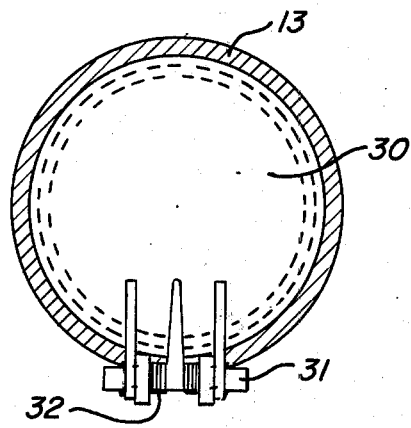
Fig_5
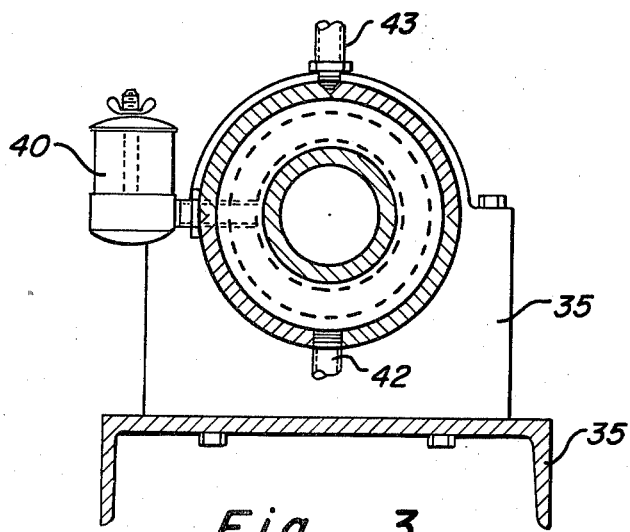
Fig_3

PARTICULATE SOLIDS PUMP

BACKGROUND AND SUMMARY OF THE INVENTION

This invention relates to screw conveyor pumps, and more particularly, to screw conveyor pumps of the type employing a flowstream of gas to facilitate transporting particular solids out of the pump.

It is well known to use screw conveyor pumps for transporting solid particulate matter such as flour, sugar, agricultural grains, dry chemical products and Portland cement. Such pumps generally require the introduction of pressurized gases forming a flowstream to facilitate the movement and suspension of the particulate solids downstream of the screw conveyor thereby preventing packing and clogging of the particulate matter. In this manner, the compressed gas is a significant factor in promoting movement of the particulate matter through the pump. The gas pressure may adversely effect the performance of the screw conveyor if not isolated from the screw since the gas pressure tends to blow back through the flights of the conveyor causing holes or voids in the stream of particulate solids being moved by the screw conveyor. Therefore, it becomes necessary to provide a seal for the screw conveyor to prevent blow back. Prior art screw conveyors have provided solutions to this problem which include varying the pitch of the flights of the screw conveyor to provide compression of the solid material thereby providing a seal; providing rotating plugs between various sections of a discontinuous screw conveyor so as to achieve seals due to the concentration of particulate matter between the sections of the screw conveyor; and using an expanding central core of the screw conveyor to provide compression of the particulate matter thereby securing a seal.

Another known approach used in conjunction with blow-back prevention seals has been the provision of a flapper valve at the terminal end of the barrel through which the screw conveyor extends. The flapper valves are generally gravity operated and close the terminal end of the barrel when the blow-back pressure exceeds the pressure due to the flow of particulate matter from the barrel. These flapper valves have caused the particulate matter to exit from the tube in a manner which causes a resistance or impediment to the flow of the particulate matter. The gravity operated flapper valves direct the exiting particulate solids downward to cause a discharge accumulation which results in decreasing the overall performance of the pump.

A further problem with prior art particulate matter pumps of the type employing pressurized flowstreams is that of preventing the gas pressure from forcing a small amount of the particulate matter into the bearings supporting the screw conveyor. Small amounts of the particulate matter can, of course, destroy the bearings after a relatively short operating period. Previous attempts to solve this problem have been relatively unsatisfactory. These attempts have included the use of special bearing seals to provide axial compression against the rotating shaft of the screw conveyor. Axial compression or sealing has proven generally unsatisfactory since the seals have a tendency to wear thereby allowing the gas pressure to force particulate matter laterally through the sealing surface into the bearings. Other prior art attempts have included supplying air pressure behind the seal which equals or exceeds that pressure in the other portions of the pump. This measure requires rather complex bearings, additional piping and pressure controls to insure that pressure in the seal will always be great enough to force any particulate matter away from the bearing. Such gas pressure seals are generally very expensive.

Accordingly, it is a general object of this invention to provide a particulate solids pump of the screw conveyor type which provides an effective blow-back seal of compacted particulate matter, which provides an innovative check valve that aids in the transportation of the particulate matter exiting from the pump, and which provides an effective and inexpensive seal against the introduction of particulate matter into the bearings of the pump.

It is an object of this invention to provide a particulate solids pump of the screw conveyor type in which an effective blow-back seal is achieved by a compacted accumulation of particulate matter formed in a sealing chamber beyond the terminal flight of the screw conveyor.

It is another object of this invention to provide a biased check valve at the terminal end of the barrel of the screw conveyor to aid in the prevention of blow back and to cause the particulate matter to exit the barrel in a manner to aid in its transportation by the flowstream of pressurized gas.

It is a further object of this invention to provide a bearing seal which provides both axial and lateral sealing against the introduction of matter along a rotating shaft.

To achieve these and other objects the present invention involves a particulate solids pump of the type having a hopper, a discharge chamber, a barrel connected from the hopper to the discharge chamber, a screw conveyor extending from the hopper into the barrel, and a drive shaft extending from the hopper for rotating the screw conveyor. The invention as it relates to a particulate solids pump of the type described includes a gas pressure distributor, a discharge chamber to create a flowstream of gas for facilitating the removal of particulate solids from the barrel and the discharge chamber, a check valve such as a flapper valve force biased toward closure of the end of the barrel in the discharge chamber and also designed to provide an effect on the particulate solids exiting the barrel to facilitate their entry into the flowstream of gas, a sealing chamber in the barrel adjacent the discharge chamber in which particulate solids are caused to accumulate and create a blow-back gas pressure seal. Further, the invention includes a unique sealing apparatus which may be used between the drive shaft and the hopper, which includes first, second and third sealing members, an annular collar carried by the drive shaft and grooves formed in the drive shaft. The first sealing member generally surrounds the drive shaft and a portion of the annular collar, and forms a portion of a packing gland reservoir. A first surface of the annular collar and a lip portion of the second sealing member including a grease retainer provide a volume therebetween in which grease may be inserted. The third sealing member adjoins the first sealing member and forms the remainder of the packing gland reservoir surrounding the grooves in the drive shaft. Packing gland material in the reservoir provides lateral and axial force to secure the seal.

The features of novelty which characterize this invention are recited with particularity in the annexed claims. The invention itself however both as to organi-

BRIEF DESCRIPTION OF THE DRAWINGS

FIG. 1 is a side view of a particulate solids pump according to the present invention;

FIG. 2 is an end view of FIG. 1 taken along section 2—2 of FIG. 1;

FIG. 3 is an end view of FIG. 1 taken along section 3—3 of FIG. 1;

FIG. 4 is an end view of FIG. 1 taken along section 4—4 of FIG. 1;

FIG. 5 is an end view of a portion of FIG. 1;

FIG. 6A, B, C, D and E are enlarged side views of a portion of FIG. 1 which also comprise a portion of the present invention.

Some of the reference numerals used in the figures identify the same elements shown in the other figures of the present invention.

DETAILED DESCRIPTION OF THE INVENTION

Referring now to the drawings and primarily to FIGS. 1 and 4, there is shown a particulate solids pump of the type having a hopper 10, a discharge chamber 11 including a discharge outlet 12, and a barrel 13 connected between the hopper 10 and the discharge chamber 11. A screw conveyor 14 including helical flights 15 extends from the hopper 10 into the barrel 11. A drive shaft 16 extends through the hopper 10 and connects with the screw conveyor 14 to provide a means for rotating the screw conveyor. The screw conveyor 14 may include a sleeve 17 to which the helical flights 15 are connected, the sleeve being adapted to slip over the drive shaft and be indexed by a locator pin 18. Screws 18a are then tightened to secure the sleeve to the shaft. Should the force on the screw conveyor 14 increase to a potentially damaging level, the pin 18 will shear and disconnect the screw conveyor 14 from the drive shaft. As the screw conveyor 14 is rotated, particulate solids received by the hopper 10 are caused to move by the flights 15 from an entrance end 19 of barrel 13 to an exit end 20 of barrel 13.

A significant feature of the present invention is the provision of a sealing chamber 22 at the exit end 20 of the barrel 13 in the discharge chamber 11. The sealing chamber results from the termination of the screw conveyor 14 short of the exit end 20 of the barrel 13. The particulate solids moved by the screw conveyor 14 are caused to occupy the volume of the sealing chamber and form an accumulation of particulate solids in the sealing chamber. As will be described more fully subsequently, particulate solids accumulated in the sealing chamber provide a blow-back seal resistant to gas pressure in the discharge chamber. A tapered reducing sleeve 23 may also be included in the exit end 20 of the barrel to aid in compacting of the particulate solids in the sealing chamber 22. Directional strips 24 cause the particulate solids to travel approximately in a longitudinal manner and cause string-like material that could wrap around the auger to move along the barrel and avoid the auger from being plugged thereby.

A further significant facit of the invention is a gas pressure distributor means or flow jacket 25 within the discharge chamber 11. The flow jacket includes an inlet 26 or means for supplying gas pressure to the flow jacket which in many cases is air. The flow jacket 25 is generally concentric with the exit end 20 of the barrel 13 and has a gas distributor ring 27 attached to the housing of the discharge chamber 11 and a second ring 27a rotatable in relation to fixed ring 27. Teeth 28 and 28a of the air distributor ring 27 and 27a create a tubular-like flowstream of gas surrounding the exit end 20 and through the discharge chamber 11 and out the discharge outlet 12. Rotation of ring 27a in relation to fixed ring 27 regulates the size of the openings between teeth 28 and 28a. The tubular-like flowstream of gas may generally be regulated as to shape and flow rate as a result of the openings of the gas distributor as determined by rings 27 and 27a and teeth 28. The tubular-like stream of gas facilitates the movement of the particulate solids exiting the exit end 20 of the barrel 13 by providing a blanket of gas around the particulate solids which tends to float these solids out the discharge outlet 12.

Another significant feature of the present invention shown also in FIG. 5 is a check valve such as a flapper valve 30 connected to the exit end 20 of the barrel 13. Flapper valve 30 may be connected to the barrel 13 by a hinge apparatus 31, and a force bias mechanism such as a spring 32 forces the flapper valve toward closure of the exit end 20 of the barrel. A closed position is illustrated in FIG. 1. When no particulate solids exit the exit end 20 of barrel 13 or when the gas pressure in the discharge chamber exceeds that pressure caused by particulate solids tending to exit the barrel 13, the force biased mechanism on the flapper valve 30 will cause the exit end 20 of the barrel to be closed.

The flapper valve is also arranged to loft or impart a vertical component to the particulate solids exiting the barrel 13. This arrangement is achieved by hinging the flapper valve at the vertical bottom of the barrel 13 and by the force bias of the spring 32. As particulate solids begin to exit the barrel 13, the flapper valve will rotate counterclockwise (as shown in FIG. 1) and when the flow rate of the particulate solids increases to a sufficient magnitude, the flapper valve will be horizontally positioned as shown by the dotted outline in FIG. 1. When the flapper valve is not yet horizontally positioned, the exiting particulate solids will contact rotated flapper valve and be lofted or imparted with a vertical component when leaving the exit end 20 of the tube barrel 13. This vertical component facilitates entry of the particulate solids into the gas stream provided by the flow jacket 25, which is particularly important when the flow rate from the barrel is not high. Arranged in this manner, the tendency for the particulate solids to clog in the discharge chamber 11 or impede the flowstream of gas is significantly reduced since the particulate solids are not caused to accumulate on the bottom of the discharge chamber, which occurs with prior art flapper valves which direct the particulate solids downward. Under high flow rate conditions the flapper valve is horizontal and no vertical component is normally required for the exiting of particulate solids since the high rate flow is sufficient to cause the particulate solids to be floated into the flowstream of gas and out of the discharge chamber 11.

The particulate solids pump further includes a base support 35 for mounting the pump and a cantilever support section 36 generally illustrated to the right of the hopper 10. Bearings 37 in the section 36 rotatably support the drive shaft 16 and thus provide a means for supporting the screw conveyor 14 within the hopper 10 and barrel 13. An oil jacket 38 is provided intermediate the bearings 37 and oil seals 39 confine the oil to the jacket 38. An oil supply tank 40 (FIG. 3) is also included for supplying oil to the oil jacket 38 by a passage communicating between the oil jacket 38 and tank 40. In some applications a water jacket 41 may be desirable to remove heat when the particulate solids pump is used in warm environments or when the particulate solids pump is used under a heavy load. A water inlet 42 and an outlet 43 are provided for circulating cooling water through the water jacket 41.

The invention also includes a unique sealing apparatus referenced generally at 50 in FIG. 1. When used in a particulate solids pump of the type described the sealing apparatus provides a unique sealing means between the drive shaft and the hopper for restricting the movement of particulate solids and gas from the hopper along the drive shaft. The sealing apparatus 50 is described in conjunction with FIG. 6.

The sealing apparatus comprises a first sealing member 51 having an aperture 52 formed therein for concentrically fitting in a closely spaced radial manner from the drive shaft 16. The first sealing member 51 also includes a receptacle 53. The receptacle is adjacent to and concentric with the shaft and faces in a first lateral direction along the shaft, for example, to the left in FIG. 6 or toward the hopper as shown in FIG. 1.

The sealing apparatus further includes an annular collar 55 carried by and sealed against the drive shaft 16. The annular collar includes a first surface 56 facing in the first lateral direction along the drive shaft 16 and a second or external surface 57. The second surface 57 is arranged so as to fit concentrically with and closely spaced radially from the receptacle 53 of the first sealing member 51. The annular collar 55 may be made of brass and may be heat or press fitted to the drive shaft 16.

The sealing apparatus further comprises a second sealing member 60 having a lip portion 63 extending axially inward to an aperture 61 concentrically fitting in a closely spaced radial manner from the drive shaft. The second sealing member 60 and the lip portion 63 provide means for retaining a lip seal grease retainer 62 to the right of the lip portion 63. The grease retainer 62 of the first sealing member faces in a direction opposite the first direction from the lip portion 63.

Means for retaining the first and second sealing members in the laterally adjacent position is provided by the holes 65 through which bolts 66 (FIGS. 1 and 2) may be inserted to retain the first and second sealing members laterally adjacent with the annular collar 55 being in the receptacle 53 of the first sealing member as described. In such an arrangement, the grease retainer 62 retained by the second sealing member is laterally adjacent the first surface 56 of the annular collar 55. So retained, grease is inserted in the sealing volume between the first surface 56 and the lip seal grease retainer 62.

The first and second sealing members may also include a grease reservoir formed, for example, by an indention 67 in the first sealing member and a ridge 68 in the second sealing member. The grease reservoir is spaced radially from the volume between drive shaft 16, the lip seal grease retainer 62 and the first surface 56, and is in communication with this volume as a result of the lateral adjacency of the first and second sealing members.

The sealing apparatus further includes a third member 70 having an aperture 71 formed therein for concentrically fitting in a closely spaced radial manner from the drive shaft 16. A threaded bolt hole 72 is provided for retaining the third member 70 laterally adjacent the first sealing member 51. The third member includes a portion of a packing gland reservoir 73 and the first member 51 provides the other portion of the packing gland reservoir. The packing gland reservoir 73 adjoins the shaft 16 at a position where shaft 16 is provided with circumferential grooves 74. The grooves 74 function to retain the packing gland material (not shown) within the reservoir 73 laterally and axially and beveled walls of the reservoir 73 also provide axial and lateral force on the packing gland material. The packing gland reservoir 73 is also provided with a means for supplying grease to the reservoir such as, for example, by passage 75 in the first sealing member 51. The grease provides lubrication for the packing gland material and may aid in forming the seal. A valve or zerk fitting 76 (FIG. 1) is provided as an inlet for the grease passage.

The sealing apparatus just described thus provides a seal highly resistant to pressure both laterally and in a radial direction. The first surface 56 of the annular collar 55, the lip 63 and the grease retainer 62 supply surfaces for retaining grease against which lateral forces from the hopper are restrained. The arrangement of the packing gland reservoir 73 surrounding the grooves 74 provide, in conjunction with the packing gland material, a seal with axial and lateral retention properties against the drive shaft. This sealing arrangement provides advantages heretofore unknown in sealing apparatus or in particulate solids pumps where a seal of this nature is of particular benefit.

The advantages of the present invention are apparent as they relate to the operation of the particulate solids pump. The particulate solids moved from the hopper 10 by the screw conveyor 14 as a result of a suitable means of power being supplied to the drive shaft 16 cause the particulate solids to enter the sealing chamber 22, and be somewhat compressed. The compression of the particulate solids in the sealing chamber forms an accumulation of somewhat compacted particulate solids that serves as a blow back seal for the gas pressure within the discharge chamber 11. As a particulate solids leave the sealing chamber 22 and exit from the exit end of the barrel, the flappeer valve applies a vertical component to the exiting particulate solids when necessary. The vertical component or loft causes the exiting particulate solids to be readily enveloped in or blanketed by the gas stream exiting the discharge chamber. By lofting the exiting particulate solids, there is no tendency for the solids to conglomerate at the bottom of the discharge chamber 11 as has been the case in previous particulate solids pumps. Furthermore, the advantages of the sealing apparatus have been described which provide important sealing characteristics.

The invention has been shown and described with particularity and it may be that those skilled in the art will foresee changes and modifications without departing from the scope of the invention. Therefore, it is intended by the appended claims to cover all such changes and modifications as fall within the true spirit and scope of the invention.

What is claimed is:

1. In a particulate solids pump of the type having a hopper, a discharge chamber including a discharge outlet, a barrel connected from the hopper to the discharge chamber, a screw conveyor extending from the hopper into the barrel, and a drive shaft extending from the hopper for rotating the screw conveyor, the improvement comprising, in combination:

a gas pressure distributor in the discharge chamber for providing a flowstream of gas in the discharge chamber;

a check valve force biased to close the barrel in the discharge chamber when pressure in the discharge chamber exceeds pressure in the barrel, said check valve arranged to facilitate entry of particulate solids into the gas flowstream;

a sealing chamber formed by the termination of the screw conveyor short of the end of the barrel thereby leaving a space which particulate solids may occupy and form a seal resistant to pressure from the discharge chamber; and, a seal means between the drive shaft and the hopper comprising:

an annular collar carried by and sealed against the drive shaft and having a first surface facing the hopper and an external surface;

a first stationary sealing member having an aperture formed therein for annularly fitting around the drive shaft and the external surface of said annular collar in a closely spaced radial manner, said first stationary sealing member also having a first portion of a grease reservoir spaced radially from the drive shaft;

a second sealing member having a lip portion including an aperture formed therein for concentrically fitting in a closely spaced radial manner from the drive shaft, said second sealing member being retained adjacent the first sealing member and laterally spaced toward the hopper, the lip portion defining means for providing a grease retainer intermediate the lip portion and the first surface of the annular collar, said second sealing member also having a second portion of a grease reservoir spaced radially from the drive shaft;

a third member providing a reservoir for retaining packing gland material, said third member being retained adjacent said first member;

means for providing the drive shaft with circumferential grooves in the grease reservoir; and, means for providing packing gland material in the packing gland reservoir.

2. The invention as recited in claim 1 wherein the gas pressure distributor comprises a flow jacket concentric with the barrel and includes means for supplying gas to the flow jacket.

3. The invention as recited in claim 2 wherein the gas supplied to said flow jacket is air.

4. The invention as recited in claim 1 wherein the check valve comprises a flapper valve hinged on said barrel and biased by and toward closure of the barrel by a spring.

5. The invention as recited in claim 4 wherein the flapper valve is hinged at the vertical bottom of the barrel whereby to apply a vertical component to particulate solids exiting the barrel.

6. A particulate solids pump, comprising:
a. a hopper adapted to receive particulate solids to be pumped;
b. a barrel having an entrance end connected to and communicating with said hopper and also having an exit end;
c. a discharge chamber connected adjacent the exit end of said barrel and including gas distributor means for creating a stream of gas for transporting particulate solids away from the exit end of said barrel;
d. a screw conveyor extending from said hopper and into said barrel and terminating short of the exit end of said barrel thereby forming a sealing chamber between the exit of said barrel and the screw conveyor, said screw conveyor further including a drive shaft projecting from said hopper and having a portion with circumferential grooves and being rotatable to cause the screw conveyor to move particulate solids from said hopper into said barrel thereby forming a blow-back gas pressure seal by the accumulation of particulate solids in the sealing chamber;
e. a check valve connected to the exit end of said barrel and force biased to close the exit end when pressure in said discharge chamber exceeds pressure from particulate solids in said barrel, said check valve arranged to facilitate entry of particulate solids moving from said barrel into the stream of gas; and,
f. sealing means for restricting movement of particulate solids and gas from the hopper along the drive shaft, comprising:
an annular collar carried by and sealed against the drive shaft and having a first surface laterally facing said hopper and also having an external surface;
a first sealing member surrounding and radially spaced a close distance from said drive shaft and the external surface of said annular collar;
a second sealing member surrounding and radially spaced a close distance from the drive shaft and being spaced adjacent the first sealing member, said second sealing member having means for providing a grease seal adjoining the first surface of the annular collar and the drive shaft;
a third member adjacent said first member and in conjunction therewith providing a packing gland reservoir surrounding the circumferential grooves in said drive shaft; and,
means for providing packing gland material in the packing gland reservoir.

7. The particulate solids pump as recited in claim 6 wherein the grease reservoir is provided with beveled walls.

8. The particulate solids pump as recited in claim 7 wherein the grooves in the drive shaft are generally V-shaped.

9. the particulate solids pump as recited in claim 6 wherein the gas distributor means comprises a flow jacket concentric with said barrel.

10. The particulate solids pump as recited in claim 9 wherein the flow jacket includes means for supplying gas thereto.

11. The particulate solids pump as recited in claim 9 wherein the exit end of said barrel extends into said discharge chamber and the flow jacket surrounds a portion of the exit end of said barrel within said discharge chamber.

12. The particulate solids pump as recited in claim 6 wherein the gas distributor means creates a generally tubular-like stream of gas extending away from the exit end of said barrel.

13. The particulate solids pump as recited in claim 6 wherein the check valve comprises a flapper valve biased toward closure of said barrel.

14. The particulate solids pump as recited in claim 13 wherein the flapper valve is hinged at the exit end of said barrel and is biased by a spring.

15. The particulate solids pump as recited in claim 13 wherein the flapper valve is hinged at the vertical bottom of the exit end of said barrel.

16. The particulate solids pump as recited in claim 13 wherein the flapper valve is arranged to impart a vertical component to the particulate solids moving from the exit end of said barrel, thereby facilitating entry of the particulate solids into the stream of gas.

17. The particulate solids pump as recited in claim 11 wherein the check valve comprises a flapper valve arranged to impart a vertical loft to the particulate solids moving from the exit end of said barrel, thereby facilitating the introduction of the particulate solids into the interior of the tubular-like stream of gas.

18. A sealing apparatus for a rotatable shaft, comprising:
- a first sealing member having an aperture formed therein for concentrically fitting in a closely spaced radial manner from the shaft, and further including a receptacle adjacent to and concentric with said shaft and facing in a first lateral direction along said shaft;
- an annular collar carried by and sealed against the shaft and having a first surface facing laterally in the first direction and a second surface for fitting concentrically within and closely radially spaced from the receptacle of said first sealing member;
- a second sealing member having a lip portion including an aperture formed therein for concentrically fitting in a closely spaced radial manner from the shaft and also including means for retaining said second sealing member laterally adjacent said first sealing member, the lip portion defining means for providing a grease retainer intermediate the first surface of the annular collar and the drive shaft;
- a third member having an aperture formed therein for concentrically fitting in a closely spaced radial manner from the shaft and also including means for retaining said third member laterally adjacent said first sealing member, said third member also providing in conjunction with said first member a sealing reservoir adjacent the shaft;
- means for providing grooves in the shaft adjacent the sealing reservoir; and,
- means for providing sealing material in the sealing reservoir.

19. The sealing apparatus as recited in claim 18 wherein the first and second sealing members include a grease reservoir spaced from and in communication with the volume between the annular collar, the grease retainer and the shaft.

20. The sealing apparatus as recited in claim 18 wherein the sealing members are adaptable to be retained in a stationary position with respect to the shaft.

21. The sealing apparatus as recited in claim 18 wherein the first sealing member also includes a portion forming the sealing reservoir.

22. The sealing apparatus as recited in claim 18 wherein the sealing reservoir adjoins the shaft and is provided with beveled wells.

23. The sealing apparatus as recited in claim 18 wherein there is provided means for supplying grease to the sealing reservoir and to the space between the annular collar, the grease retainer and the shaft.

* * * * *